United States Patent Office 3,377,547
Patented Apr. 9, 1968

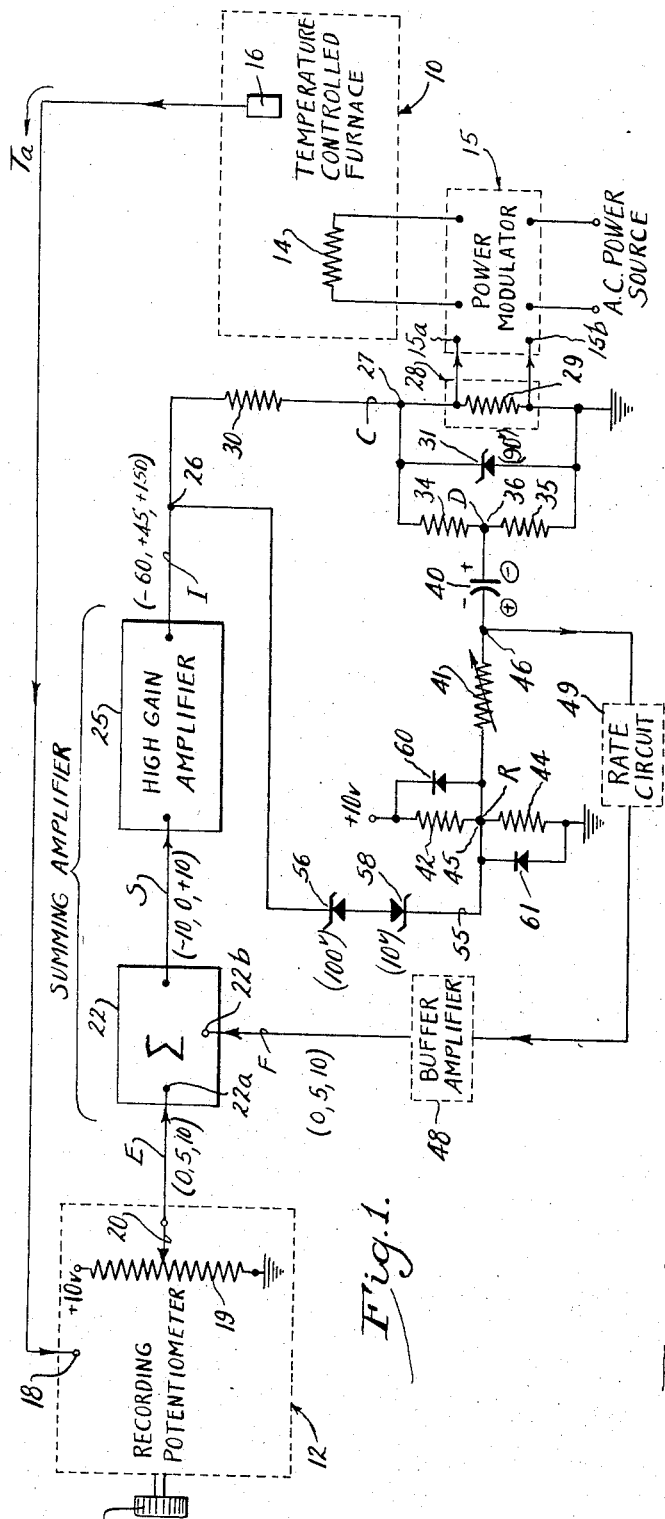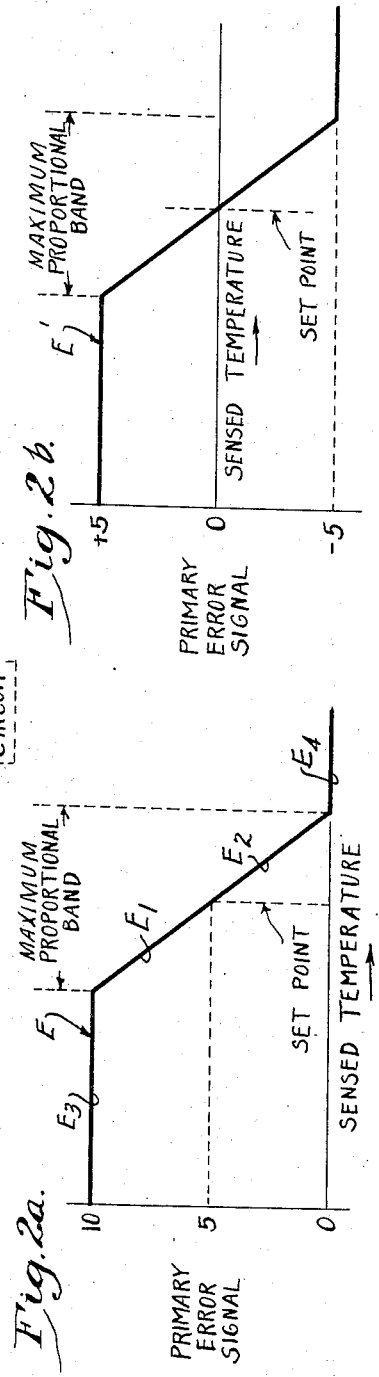

3,377,547
AUTOMATIC AC POWER CONTROL SYSTEM
WITH RESET WINDUP PREVENTION
Gunnar F. Ohlson, Rockford, Ill., assignor to Barber-Colman Company, Rockford, Ill., a corporation of Illinois
Filed Mar. 12, 1965, Ser. No. 439,221
14 Claims. (Cl. 323—100)

ABSTRACT OF THE DISCLOSURE

An automatic condition-controlling system having reset action (with or without rate action) and wherein "reset windup" is alleviated by lessening or inhibiting the maximum or minimum swing of a reset signal which varies as a time integral function of the error. The inhibiting of the reset signal is made proportional to the amount by which the internal error signal exceeds or falls below first and second fixed threshold values which are established by back-to-back Zener diodes and which lie outside the range through which the internal error signal varies during operation of the system within the proportional band. When either Zener diode conducts, it reduces the maximum magnitude to which a capacitor can charge by changing the value of an anti-reset signal which otherwise has a reference value. Excessive inhibition, which would reverse the polarity of the reset signal, is prevented by clamping diodes which limit further changes in the anti-reset signal if the internal error signal should swing beyond the threshold values by more than predetermined amounts. The alleviation of reset windup is achieved by very simple circuits and circuit components solely in response to the internal error signal.

The present invention relates in general to automatic control systems for correctively adjusting and maintaining a controlled condition in agreement with a set point value. More particularly, the invention is concerned with such control systems having proportional plus reset action, and in which provision is made for alleviating or avoiding "reset windup."

By way of a general introduction and review of automatic control systems it may be observed that the principal objective in the use of any such system is to control the rate of transfer of a manipulated medium which in turn affects a controlled variable so as to bring the latter to and maintain it at a desired set point value. Randomly selected examples of the many conditions requiring such control are (a) the temperature of a given enclosure or room, (b) the temperature of a vat containing chemicals, foods or other materials to be heat treated, (c) the level of a liquid in a tank from which fluid is being continually or intermittently withdrawn at a constant or changeable rate, and (d) the speed of a movable load driven by an engine or motor. In those examples, the manipulated medium might be, for instance, (a) hot air under pressure admitted to the enclosure or room at a rate controlled by opening or closing a damper, (b) steam or hot fluid admitted into coils or radiators disposed in the vat, and at a rate controlled by opening or closing a valve, (c) liquid admitted to the tank at different rates by opening or closing a control valve or by increasing or decreasing the speed of a pump, or (d) fuel or electric energy fed to the load-driving engine or electric motor at rates determined by opening or closing a throttle, or modulating a controllable electric impedance. It is frequently the nature of such controlled conditions that the manipulated medium must be supplied thereto at a given rate just to make up for losses (e.g., the heat lost to ambient atmosphere from a temperature controlled vat), even though the error is zero and the condition is maintained constant at a given set point value. If the rate of loss is increased or decreased (by a change in ambient temperature, a change in the set point temperature, or the quantity of the material being controlled in temperature), then the rate of transfer of the manipulated medium (hereinafter called "transfer" for the sake of brevity) must be changed to a new steady state value to maintain the controlled condition at the set point value.

Proportional action control systems are well known, and are so named because transfer is proportional to the departure or error between the set point value and the actual value of the controlled condition, within a given range of condition values (called the proportional band). In most instances, the proportional band is in width relatively narrow (e.g., a span of ±50° about the set point value) compared with the total range (e.g., 100° to 1000°) within which the set point may be adjusted and the condition controlled. A control system with proportional action provides maximum transfer of the manipulated medium when the controlled condition is below the proportional band, and provides minimum or zero transfer of the manipulated medium when the controlled condition is above the proportional band. The rate of transfer of the manipulated medium is inversely proportional to the departure of the sensed value of the condition from the set point so long as the latter does not fall outside the values within the proportional band. At a predetermined set point, usually at mid-point of the proportional band, a certain rate of transfer of the manipulated medium will be established to maintain the controlled condition at the set point value in order to make up for normal losses.

When the rate of transfer of the medium with the system adjusted for a given set point value maintains the controlled condition at a value differing from the set point, the difference is known as "offset," and the amount of offset differs according to the load and the set point value. Such offset can be eliminated by shifting the proportional band to another region within the overall span of controller operation so that at the same set point value the rate of transfer of the manipulated medium becomes equal to that necessary to maintain the controlled condition in agreement with the set point value.

This correction is known as "reset." It can be accomplished by manual adjustment of the controller apparatus, but this is inconvenient and especially undesirable when the load changes or the set point is adjusted frequently. Manual reset can be replaced by automatic reset which depends upon integral action in the control system. Controllers having proportional plus automatic reset action, sometimes called "integral" action, have proven very satisfactory for controlling conditions over a range of values which fall within the original proportional band by, in effect, artificially and automatically shifting the proportional band. However, such automatic reset control systems generally produce large overshoots in response to upsets which produce errors falling outside the proportional band. Such extreme disturbances are caused, for example, by start-up, large changes in set point, or major load changes. Overshoot must be prevented or held to very small values in many critical processes, such as those involving temperature control in chemical reactions, diffusion, crystal growing, food canning, batch-sintering, batch-brazing, or special heat treating—where elevation even momentarily above a set point temperature value may adversely affect the quality of the product.

In control systems having reset action, transfer of the manipulated medium is increased or decreased as the time during which a positive or negative error persists or continues. In other words, transfer of the manipulated medium is in part proportional to the time integral of the error. The larger the error and the longer it exists, the greater is the effect of such integration and the greater is the change in the rate of manipulated medium transfer as compared with that which would obtain as a result of proportional action by itself. The integration involved in reset action proceeds in a given direction until the sensed or actual value of the controlled condition reaches and crosses the set point value, assuring that there will be some overshoot. The longer the integration has continued, the greater will be the overshoot. When integration has continued for a prolonged time so that it has exceeded any beneficial value, the reset control is said to be "wound up," making overshoot almost inevitable and resulting in cycling or hunting of the controlled condition until it settles down to the set point value.

Such overshoot in control systems having proportional plus reset action may be limited or alleviated somewhat by also incorporating rate action (i.e., derivative action) to provide what has been called an "anticipation" effect. With rate before reset action, the reset control apparatus detects what appears to be zero error and changes the direction of integration before the controlled condition reaches the set point value. It is possible under special circumstances by proper setting of rate and reset parameters (time constants) to eliminate overshoot even after the reset control has been wound up. However, all rate action is limited in its effect for a short time after a change in the error occurs, so that the full corrective effect of the rate control may not be available to eliminate overshoot. Moreover, if rate time is adjusted to most nearly eliminate or minimize overshoot, this severely detracts from the ability of the system to produce offset correction. The use of rate before reset action can optimize a control system for one condition only, so that if prevention of overshoot on start-up is the condition to be optimized, the response of the system in eliminating smaller errors under "on line" conditions suffers. While proper selection of rate and reset parameters can satisfactorily alleviate overshoot in a process control system which requires eighty to ninety percent of the maximum available rate of medium transfer to maintain equilibrium at the set point, a process control system requiring only ten to twenty percent of the maximum transfer rate under conditions of equilibrium will very likely overshoot despite any adjustments which are made in the rate and reset parameters. Because a complete control system utilizing only a small fraction of the maximum medium transfer under conditions of equilibrium provides minimum response time in correction of errors, process control systems requiring low percentages of available rates of medium transfer are quite common and desirable. It is in this exemplary environment that it becomes important to eliminate the adverse effects of reset windup.

Ideally, rate and reset actions should be employed and adjusted to produce optimum "on line" control responses, i.e., to quickly restore the controlled condition to the set point value, with elimination of offset, when it undergoes minor departures therefrom. Under those conditions, proportional plus rate before reset action will not prevent reset windup, especially under the severe demands imposed by start-up (e.g., when a controller is turned on to bring a vat or furnace from ambient temperature up to an elevated control point temperature), or large and abrupt changes in the set point value or load.

The problems of reset windup and solutions therefor are treated in the copending application of Ohlson, Ser. No. 258,765, filed February 15, 1963 (now U.S. Patent 3,221,257), and in the copending application of Eksten et al., Ser. No. 112,910, filed May 26, 1961 (now U.S. Patent 3,219,936), both such applications being assigned to the assignee of the present invention. Reference to such copending applications will provide useful background information for the description to be set forth below, but it will suffice here simply to note that in such copending applications it has been proposed to substantially eliminate reset windup by inhibiting and reducing the reset signal which arises in the reset action-producing apparatus of a controller when a combined function of input error signal and controller internal error signal exceeds a predetermined value.

It is the primary aim of the present invention to provide a proportional plus reset control system which substantially eliminates the undesirable effects of reset windup, and yet in which the physical components for achieving this result are susceptible of embodiment and construction with relatively few, inexpensive, simple, and reliable components.

It is a related object of the invention to achieve the foregoing by inhibiting reset windup solely in response to the value of an internal error signal which exists in a control system having proportional plus reset action (and with or without rate action).

These and other objects will become apparent as the following description proceeds, taken in conjunction with the accompanying drawings, in which:

FIGURE 1 is a schematic diagram, partly in block-and-line form, illustrating an exemplary control system embodying the invention; and FIGS. 2a and 2b are graphs illustrating the relationship of a primary error signal to the proportional band and set point in such a system as the controlled temperature takes on different values.

While the invention has been shown and will be described in some detail with reference to a particular embodiment thereof, there is no intention that it thus be limited to such detail. On the contrary, it is intended here to cover all modifications, alternatives and equivalents falling within the spirit and scope of the invention as defined by the appended claims.

Referring now to FIG. 1, the automatic control system there shown is constructed to corectively adjust and maintain the temperature of a chamber or furnace 10 in agreement with a set point value selected by adjustment of a knob 11 associated with a recording potentiometer 12 of well known and conventional type. In this instance the temperature of the furnace 10 is adjusted and maintained by varying magnitude of current flow through a resistance heating element 14, and thus the temperature of and rate of heat energy generated in that element. As here shown, the heating current through the element 14 is supplied from an A.C. power source and controlled in its magnitude by a power modulator 15 according to the magnitude of an input signal applied to its input terminals 15a, 15b. It is to be understood that the illustrated system in which the controlled condition is the temperature within a furnace and in which the manipulated medium is electrical current, constitutes but one example, and that the invention is equally applicable in controlling any of a wide variety of conditions by varying the transfer rate of any of a wide variety of manipulated mediums.

In order to signal the deviation or error between the desired or set point value and the actual value of the controlled temperature, a condition sensor 16 is disposed in the furnace 10 and adapted to produce a signal $Ta$ indicative of the actual temperature. Such a sensor may, for example, take the form of a thermocouple. The temperature-representing signal $Ta$ is supplied to the input 18 of the recording potentiometer 12. Because the organization and operation of such devices are well known, it will suffice simply to indicate that the potentiometer includes a transmitting slidewire 19 having wiper 20 driven to positions therealong which correspond to the sensed temperature value within a limited band. The slidewire is connected at its upper end to a +10 volt source and at its lower end to a point of zero reference potential, here shown as ground. The wiper 20 is moved upwardly toward the +10 volt extremity of the slidewire as the sensed temperature decreases, and is moved downwardly toward the grounded extremity as the sensed temperature increases. The mid-point of the slidewire in most instances represents the set point value, and has a potential of +5 volts. The span of temperatures represented by the opposite extremities of the slidewire 19 constitutes the maximum proportional band and may, for example, represent a range of temperatures between 950° and 1050° when the set point value has been adjusted for 1000°.

As illustrated in FIG. 2a, the primary error signal E appearing on the wiper 20 varies inversely with changes in the sensed temperature over a predetermined span shown as the maximum proportional band. The proportional band may be, and usually is, only a selected portion of this span. Assuming that the center of the proportional band represents the set point, the primary error signal varies in sense and magnitude according to the sign and extent of the difference error between the set point value and the sensed temperature value. In the present example, the error signal E varies with a suppressed zero, i.e., there is a bias level of +5 volts when the temperature error is zero, and the error signal rises or falls linearly (curve portion $E_1$ or $E_2$) to a maximum or minimum of +10 volts or 0 volts as the sensed temperature decreases or increases to the limits of the span. If the sensed temperature falls below or rises above the span of the proportional band, the potential of the wiper 20 (FIG. 1) cannot rise above or fall below +10 or 0 volts, and the primary error signal remains at such maximum or minimum values (curve portions $E_3$ and $E_4$). No specific numerical values have been shown along the horizontal axis of FIG. 2a since both the span and the set point may be adjusted up or down along the sensed temperature scale. In general, when the set point is readjusted, the proportional band is shifted by a corresponding amount.

It is important to understand that while the slidewire 19 and the wiper 20 in FIG. 1 produce variation of the error signal about a suppressed zero reference of +5 volts, the effective value of the error signal is its departure from the reference. In other words, the effective variations of the primary error signal are as shown by curve E' in FIG. 2b, without zero suppression, the error varying from 0 to +5 volts or −5 volts as the sensed temperature varies from the set point to the respective limits of the span.

To amplify the primary error signal E appearing on the wiper 20, it is supplied to one input terminal 22a of a summing amplifier, the latter being illustrated as including an algebraic summing device 22 in tandem with a high gain amplifier 25. A negative feedback signal F is produced in a manner to be described below and applied to the other input 22b of the summing device 22. For the present it will suffice to note that the output S of the summing device 22 is proportional to the algebraic combination (E−F) and this in turn forms the input signal S to the amplifier 25.

The output of the amplifier 25 appears on a terminal 26, and is termed the "internal error signal" of the controller. Because of the high gain of the amplifier, the internal error signal I has, by way of example, a value of +45 volts when the sum signal S is zero, and a value of +150 or −60 volts at its limits. This is a suppressed zero range of variation, with the internal error signal having a mid-point value of +45 volts. Thus, the internal error signal I may vary over a wide range due to high amplification of the difference between the error signal E and the negative feedback signal F.

In order to correctively adjust the current flow through the heating element 14, and thus the temperature within the furnace 10, the power modulator 15 is controlled by a pilot amplifier 28 here shown in simplified form as including a load resistor 29. Because pilot amplifiers and power modulators are well known and may take any of a variety of specific forms, the details have not here been illustrated. It need only be stated that the power modulator is responsive to the controller output signal or voltage applied to the load resistor 29, and operates to vary the rate of heat energy dissipation in the heater element 14 from a minimum (e.g., zero watts) to a maximum (e.g., ten kilowatts) as the voltage applied to the load resistor 29 varies from minimum to maximum values, which will here be assumed as 0 volt and 90 volts, respectively. The rate of heating in the furnace is half its maximum value when the voltage across the load resistor is 45 volts, and it will be assumed for convenience in the following discussion that such a 5 kilowatt input is just sufficient to balance heat losses from the furnace when the temperature of the latter is constant at a selected set point value.

In practicing the present invention, means are provided to produce a controller output signal C which varies substantially in proportion to the internal error signal I, but which cannot vary above or below predetermined maximum or minimum values even though the internal error signal might otherwise call for such variations. This control signal is applied to means for varying the rate of transfer of the manipulated medium, here symbolically represented by the pilot amplifier 28 containing the load resistor 29, to vary the current flow through and the rate of heat dissipation in the resistance element 14. In the present instance, such an output signal is derived from the internal error signal I by connecting a Zener diode 31 in parallel with the load resistor 29, the parallel combination being connected in series with a resistor 30 between the terminal 26 and ground. The Zener diode is poled to be non-conductive so long as the internal error voltage I is positive and less than a predetermined value, say 90 volts, equal to the Zener breakdown potential of the diode. The Zener diode 31 and the resistor 30 serve as a clamping means to limit both the maximum and minimum values of the controller output signal.

In operation, as the internal error signal increases progressively from zero, the output voltage C appearing at a terminal 27 and applied to the load resistor 29 varies in direct proportion and is equal to the internal error voltage I (neglecting for the sake of explanation the small voltage drop appearing across the low-valued resistor 30), until the internal error voltage I exceeds +90 volts, when the Zener diode 31 breaks down and conducts reversely, thereby clamping the output voltage C to a value of +90 volts. The additional current flow through the Zener diode, when it conducts in a reverse direction as the internal error signal rises above +90 volts, produces an increasing voltage drop across the resistor 30, this voltage drop being equal to the difference between the 90 volt maximum value of the control voltage C and the then existing higher value of the internal error voltage I. Thus, even though the internal error voltage rises to values as high as +150 volts, the control voltage C remains at +90 volts after the internal error voltage exceeds +90 volts. On the other hand, when the internal error voltage falls below 0 volt, the Zener diode 31 will begin to conduct in a forward direction with negligible resistance. In this way, the control voltage C is clamped to a minimum value of 0 volt even though the internal error signal I falls to a value as low as −60 volts.

For the purpose of providing the negative feedback signal F to the summing device 22, and producing reset action, the value of the control voltage C is sensed and utilized. In order to produce a convenient range of feedback voltage variations in opposite directions about a selected reference level, the control voltage C is applied to a voltage divider formed by series resistors 34 and 35 connected in parallel with the load resistor 29. Assuming that in the present system the controlled temperature is maintained substantially equal to the set point value (i.e., there is no offset) when the heater element 14 receives half maximum power (e.g., five kilowatts), the voltage divider resistors 34 and 35 are chosen such that a potential of +5 volts is produced at the junction 36 thereof when the output voltage C is midway (i.e., is at +45 volts) within its range of variation. To accomplish this, the resistor 34 is made eight times as great in ohmic value as the resistor 35, so that the potential at the junction 36 varies from 0 to +5 to +10 volts when the control voltage C varies from 0 to +45 to +90 volts, respectively. It will be apparent that this output-representing voltage D at the junction 36 varies about a suppressed zero reference of +5 volts, changing by +5 volts as the output voltage C swings from its mid-range value of +45 volts to its limits of +90 volts and 0 volts. It will be helpful in the analysis to follow to consider voltage D in terms of its departure from the reference value of +5 volts.

To produce the negative feedback signal and achieve reset action, an R-C circuit comprising a capacitor 40 and a resistor 41 are connected in series between the junction 36 and a point of reference potential. For the purpose of providing such a point of reference potential, a voltage divider formed by equal-valued resistors 42, 44 is connected between a +10 volt source and ground, the junction 45 between such resistors, to which the resistor 41 is connected, thus normally residing at a +5 volt reference potential R. Connection is made from the junction 46 between the capacitor 40 and the resistor 41 to the second input terminal 22b of the summing device 22. This connection may, if desired, include a rate circuit 49 of conventional organization to provide rate action, and also a buffer amplifier 48, although this is not essential to the utilization of the present invention.

As thus far described, the apparatus produces automatic reset action in the following manner. First, it will be apparent that when the system is at equilibrium without offset, and the heating element is dissipating half of the maximum power available, the junctions 36 and 45 will both reside at +5 volt reference potentials, and the capacitor 40 will have 0 volt thereacross. There being no current flow through the resistor 41, the potential at the junction 46 will be at the reference value of +5 volts, and this value will be supplied as the negative feedback voltage to terminal 22b. The sum signal S will thus be zero, and the internal error voltage I will have a value of approximately 45 volts.

When, however, an error between the control temperature and the set point value occurs (for example, the set point value is increased), causing the primary error signal E, the sum signal S, the internal error signal I, and the control signal C to increase suddenly, the load representing voltage D increases above its normal 5 volt level. Thus, the terminal 36 immediately rises above the potential at junction 45. The difference in potentials at the junctions 36 and 45 appears initially across resistor 41 as a voltage drop due to charging current drawn by the capacitor 40, so that the potential at junction 46 is instantaneously substantially the same as that at junction 36. Accordingly, the feedback signal F is instantaneously increased and the sum signal S, forming the input to the amplifier 25 is instantaneously restored to a very low value.

As time passes, however, the reset capacitor 40 progressively charges to acquire a voltage thereacross represented by the uncircled polarity signs in FIG. 1. This capacitor voltage, herein termed the reset signal, is proportional to the time integral of the charging current flowing through the resistor 41. In the present instance the normal or reference value of the reset voltage is zero, by virtue of the fact that the normal or reference levels of the potentials at junctions 36 and 45 are both +5 volts. It is to be understood, however, that the reset voltage is the departure, either positive or negative, of the capacitor voltage from a normal or reference value, and that the latter reference value may have values other than zero. As the rest voltage across capacitor 40 increases from its reference level, the charging current flow through resistor 41 decreases, and the potential at the junction 46 gradually decreases back toward the original +5 volt potential. In other words, as the reset signal or voltage across the capacitor 40 builds up with time, the previous change in the negative feedback signal is removed, so that the overall gain of the summing amplifier, with respect to the primary error signal E, is increased. Thus, when reset action begins after a disturbance which causes an increase in the primary error signal E, the negative feedback signal F initially substantially equals the primary error signal E so that the net input signal to the amplifier 25 is small. As reset action continues, however, the net input signal S increases at a rate dependent upon the product of the values of the capacitor 40 and the resistor 41, the negative feedback signal being progressively decreased as the voltage buildup across the capacitor 40 increases.

With such progressive increase in the net input to the amplifier 25, the internal error signal I progressively increases and the control signal C progressively increases, further increasing the potential difference between the junctions 36 and 45. The same sequence of operations previously described thus occur again, but this is a continuous operation rather than a step-by-step process, and it results in a steady increase in the output signal C. In other words, the capacitor 40 and the reset voltage which builds up across it as a time integral function result in a decrease in the negative feedback signal, an increase in overall system gain, and an increase in the output signal C relative to the value it would otherwise have for a given error voltage E in the absence of reset action. The increase in the output signal C causes current flow through the heating element 14 to progressively increase, so that the temperature in the furnace 10 begins to rise. This in turn reduces the magnitude of the primary error voltage E, and the net input to the amplifier 25 will decrease, causing the internal error signal I to decrease, and in turn causing the control signal C to decrease, so that the potential at the junction 36 begins to fall back toward its nominal 5 volt potential. When this occurs, the capacitor 40 will begin discharging by current flow from the reference junction 45 through the resistor 41, and the previous continuous sequence of operations will occur in a reverse sense. The capacitor will be discharged until the system is restored to equilibrium with the sensed temperature at the higher set point value.

It should be noted that the same type of operation will occur in respense to an upset or disturbance which initially causes the primary error signal E to abruptly decrease. In that case, the load voltage D falls below +5 volts, and the capacitor 40 charges in the opposite direction to a voltage represented by the circled polarity signs in FIG. 1. The system thus corrects for both positive and negative errors in substantially the same way. Noteworthy is the fact, however, that once the capacitor begins to charge in one direction or the other after an upset has occurred, it cannot begin to discharge until the potential of the junction 36, which is proportional to the output signal C, begins to move back toward its original 5 volt level. Thus some overshoot of the temperature relative to the set point value will occur, but as long as the disturbance is insufficient to drive the primary error signal outside of the proportional band, the reset action will correct for offset without producing seriously objectionable or excessive overshoot.

It will be observed that the feedback and reset apparatus results in the negative feedback voltage F varying about the +5 volt reference level as a result of the voltage drop across the resistor 41. While the feedback voltage varies as the time derivative of the difference error, i.e., the derivative of the difference between the reference and load signals R and D, a derivative variation in a negative feedback path produces the same integrating or reset action as a time integral variation in the input to an amplifier. In either case, a reset signal is produced which varies as a time integral function, and which in effect creates a component in the controller output signal which varies as the time integral of the input error. Such reset signal in the present example is the voltage across the capacitor 40 which varies as a time integral function of the difference between the voltages R and D. This reset signal across the capacitor acts to reduce the feedback signal which otherwise would appear across the resistor 41, thereby making the overall gain of the system greater during correction of large disturbances. Thus, while the summing amplifier responds to the feedback voltage drop across the resistor 41, it also is affected by and responds indirectly to time integral variation of the reset voltage across the capacitor 40.

Consider now an upset so large in magnitude as to make the difference error between the set point value and the controlled temperature exceed the proportional band. Since the system is operating outside of the proportional band, the amplified internal error signal I falls below or rises above the 0 to 90 volt range corresponding to the proportional band, but the output voltage C is clamped at 0 or 90 volts, respectively, by the Zener diode 31. The action described above commences and persists for a much longer period of time, since as the controlled temperature initially begins to move toward the set point value, there is no change in the control signal C which has reached its maximum or minimum value of +90 or 0 volts.

Thus, under these conditions when the system is operating outside of the proportional band, the capacitor 40 acquires more and more charge prior to the controlled temperature entering the proportional band. Indeed, if the output voltage C remains at its maximum or minimum value (+90 or 0 volts) for a sufficiently long time, then the reset voltage across the capacitor 40 will reach its maximum or minimum value of +5 or −5 volts. As the reset voltage approaches or reaches such a maximum or minimum value, charging current diminishes and falls to zero, so that the negative feedback signal is removed and the overall gain of the amplifier rises to very high values. This serves no useful purpose, however, since under conditions outside the proportional band, the primary error voltage E is sufficient to drive the internal error signal above 90 volts or below zero volts, and thus to make the output signal reach its maximum or minimum value. Then, as the primary error signal is reduced in magnitude after the controlled temperature enters the proportional band, the resulting reduction in the net input to the amplifier 25 is insufficient to overcome the cumulative effect of the extremely high charge acquired by the reset capacitor 40 and the internal error signal I persists at values above 90 volts or below 0 volts for some time, causing excessive overshoot. This excessive voltage on the capacitor 40 is termed "reset windup," and it causes the control system to supply the manipulated medium to the controlled condition at a greater rate than is required once the proportional band has been entered, thereby resulting in severe and excessive overshoot.

It has been recognized in the disclosures of the Ohlson and Eksten et al. copending applications identified above that reset windup can be eliminated by preventing the voltage acquired by a reset capacitor from increasing to excessive levels. However, the present invention makes it possible to inhibit excessive reset action or windup by circuit components of the very simplest nature, and which serve effectively even though they respond to produce anti-reset action solely in response to the controller internal error signal.

In accordance with the present invention, the controller output signal C is derived from the internal error signal in the manner previously described. In particular, the output signal C varies in proportion to changes in the internal error signal as the latter varies between predetermined first and second values (here described as +90 volts and 0 volts). The output signal is limited by clamping means, here described as the resistor 30 and the Zener diode 31, which prevents the output signal from rising above or falling below first maximum and minimum values (90 volts and 0 volts) even though the internal error signal substantially rises above or falls below corresponding values.

In conjunction with such provision which makes the output voltage C swing over a narrower range than the internal error voltage I, an auxiliary signal is produced which varies according to the amounts by which the internal error signal rises above or falls below predetermined threshold values. Such threshold values are respectively greater and less than the predetermined first and second values of the internal error signal which cause the output signal to reach its maximum or minimum values, so that the auxiliary signal remains zero unless the control system is in a condition which could result in reset windup.

As here shown in FIG. 1, the auxiliary signal appears on a conductor 55 which is connected through oppositely poled Zener diodes 56 and 58 to the internal error signal appearing on terminal 26. As the internal error signal increases positively from a 0 volt level, the Zener diode 56 is non-conductive until the internal error signal becomes sufficiently large to cause reverse breakdown of that diode. Thus, when the internal error signal is positive, the conductor 55 is effectively disconnected from the terminal 26 until the internal error signal exceeds the reverse breakdown potential of the Zener diode 56 relative to the potential appearing at the junction 45.

In addition, when the internal error signal swings negative in polarity, the Zener diode 58 in effect disconnects the conductor 55 from the terminal 26 until the difference between the potential at the junction 45 and the internal error signal voltage at the terminal 26 exceeds the Zener breakdown value of the diode 58. Thus, the two Zener diodes 56 and 58 establish upper and lower threshold values above which or below which the internal error signal must rise or fall before any effect or auxiliary signal is produced on the conductor 55.

In the present instance where the ranges of signal variation are those which have been designated by way of example, the Zener diode 56 is chosen to have a breakdown potential of 100 volts, while the Zener diode 58 is chosen to have a breakdown potential of 10 volts. Inasmuch as the junction 45 normally resides at a +5 volt reference potential, the Zener diode 56 will not conduct reversely until the internal error signal rises to a threshold value of +105 volts. When this occurs, the diodes 56 and 58 conduct in reverse and forward directions, respectively, with a 100 volt drop appearing across the diode 56. Conversely, when the internal error voltage I falls from the nominal +45 volt level, the Zener diode 58 will not conduct reversely until the signal I falls to a low threshold of −5 volts. When that occurs, however, the diodes 56 and 58 conduct forwardly and reversely, respectively, with a 10 volt drop appearing across the diode 58. This means, then, that as the internal error signal reaches values of +105 volts or −5 volts and progressively rises or falls therefrom, the conductor 55 tends to progressively rise or fall from its normal potential of +5 volts due to changes in the current flow through the resistors 42 and 44. The auxiliary signal is preferably viewed as the incremental change imparted to the potential of the junction 45. Thus, as the internal error signal I takes on values of +106, +107 and +108 volts, the auxiliary signal becomes +1, +2 and +3 volts. Similarly, when the voltage I takes on values of −6, −7 and −8 volts, the auxiliary signal becomes −1, −2 and −3 volts. In those examples, the potential at junction 45 would become +6, +7 and +8 volts; or +4, +3 and +2 volts. By the time that the internal error signals has increased to +110 volts or fallen to −10 volts, the auxiliary signal will have reached +5 volts or −5 volts, and the voltage at junction 45 will have been changed to +10 volts or 0 volts, respectively.

It will be apparent that if the auxiliary signal is other than zero, then the internal error signal will be higher or lower than +105 volts or −5 volts, so that the output voltage C will be at its maximum or minimum value of +90 volts or 0 volts. The load potential D will therefore be at its maximum or minimum values of +10 volts or 0 volts, and if this condition were to persist, in the absence of inhibition, the capacitor 40 would charge to a reset voltage of +5 or −5 volts. If uncorrected, this windup would result in overshoot.

The present invention inhibits and reduces the reset voltage in response to the auxiliary signal produced when the internal error signal rises above or falls below the threshold values. For when the auxiliary signal appears with a positive or negative value, the potential of the junction 45 is correspondingly increased or decreased relative to the +5 reference level. This means that as the threshold values are exceeded in a positive or negative sense, the voltage difference between the junctions 36 and 45 is reduced, and the capacitor 40 is discharged to reduce the reset voltage (whether positive or negative) appearing thereon. More precisely all of this occurs almost simultaneously so that the effect of the auxiliary signal is to inhibit and prevent the reset voltage from reaching the high value to which it would otherwise charge.

The amount of inhibition or reduction in the reset voltage depends upon the severity of conditions and the degree of windup which otherwise would result. If the internal signal rises or falls below a threshold value by 1, 2 or 3 volts, the reset voltage will be inhibited by 1, 2 or 3 volts, and the maximum magnitude of the reset voltage will be 4, 3 or 2 volts, respectively. Thus, the reset voltage on capacitor 40 will not necessarily be fully prevented but it will be inhibited or diminished to an extent by which the internal error signal rises above or falls below a threshold value.

From the foregoing, it will be apparent that an anti-reset signal or variation is applied to the capacitor 40 so as to reduce the reset signal thereacross only if the internal error signal exceeds predetermined threshold values. Thus, normal reset action is obtained without any inhibition unless the conditions are so severe that the system is probably working outside of the proportional band and reset windup would otherwise result. After reset inhibition begins, it is applied to a degree which is proportional to the severity of the reset windup which is likely to otherwise result, i.e., it is applied to a degree by which the internal error signal exceeds the threshold values. And, if the threshold values are exceeded by relatively large amounts (by +5 or −5 volts) tending to make the auxiliary signal large, then the reset signal appearing across the capacitor 40 is fully inhibited or reduced to zero so that the maximum alleviation of reset windup is achieved.

It may be noted, however, that the internal error signal I may swing by very large amounts above or below the upper and lower threshold values. With the assumption that those threshold values are +105 volts and −5 volts, respectively, and if the internal error signal reaches extremes of +150 or −60 volts, then the auxiliary signal on conductor 55 could vary over the wide range of +45 to −55 volts. The original reset voltage appearing on the capacitor 40 would not only be totally inhibited, but the capacitor would be recharged in the opposite polarity beyond the reference value (here 0 volts). Such polarity reversal would delay restoration of the system to equilibrium conditions after the controlled temperature enters the proportional band, causing a tendency to undershoot, and it is therefore to be avoided. In accordance with another aspect of the present invention, provision is made to eliminate reversal of a reset voltage (relative to the chosen reference level, here 0 volt) appearing across the capacitor 40. This is accomplished by deriving from the auxiliary signal appearing on the conductor 55, an anti-reset signal which varies in proportion to the auxiliary signal but which cannot rise above or fall below predetermined maximum and minimum values even though the auxiliary signal might otherwise tend to make it swing beyond such values. In other words, even though the auxiliary voltage, viewed as the signal variation which might occur on conductor 55, may tend to take on extremely large positive or negative values, it is converted into an anti-reset signal which varies in a different manner, and which is effectively applied to reduce the reset voltage on the capacitor 40. The anti-reset signal is limited in its maximum and minimum values so that it cannot exceed the maximum and minimum values of the reset voltage.

For this purpose, clamping means in the form of diodes 60 and 61 are connected in parallel with the voltage-divider resistors 42 and 44, respectively. The diode 60 is poled to conduct forward current from the junction 45 to the +10 volt source, while the diode 61 is poled to conduct forward current from a point of ground potential at the lower end of the resistor 44 to the junction 45. These diodes are thus normally biased in a reverse direction and non-conductive. With such connections, it will be apparent that even though the auxiliary signal applied to the conductor 55 might tend to swing the potential of the junction 45 above a +10 volt value or below a 0 volt value, such excursions beyond those values are prevented by the diodes 60 and 61. If the junction 45 tends to swing more positive than +10 volts, then the diode 60 becomes conductive, and clamps the junction 45 to a +10 volt level. Conversely, if the junction 45 tends to swing below a zero volt level, then the diode 61 conducts in a forward direction and prevents the junction 45 from falling below the zero volt level.

As a result of this clamping operation, the maximum anti-reset effect is to fully reduce or inhibit the reset signal appearing across the capacitor 40 from its maximum magnitude of ±5 volts to zero, and without any possibility of the reset signal being driven to its opposite polarity, relative to the reference level of zero volts. In this way, the anti-reset signal which is applied to the left end of the resistor 41 by changing the junction 45 from its reference +5 volt potential fully inhibits the reset signal when the internal error signal rises above or falls below values of +110 volts or −10 volts, but thereafter produces no further effect.

In review, it may be noted that the output voltage C is limited to maximum and minimum values (+90 and 0 volts) which are produced in response to the internal error voltage I reaching predetermined first and second values (+90 and 0 volts) and which result in maximum corrective action. The internal error signal I may rise above or fall below such first and second values, and it is not until the internal error signal rises above or falls below upper and lower threshold values (+105 and −5 volts) that any reset inhibiting occurs. The threshold values (+105 and −5 volts) are greater than the predetermined first and second values (+90 and 0 volts) by predetermined amounts (+15 and −5 volts, respectively). Moreover, because the load-responsive voltage D at junction 36 is limited to variations of +5 volts about a +5 volt reference level, the reset voltage appearing across capacitor 40 is limited to second maximum and minimum values (here +5 volts and −5 volts relative to the reference value of +5 volts) when the capacitor is charged to the maximum extent with one polarity or the other. Although the auxiliary signal varies in proportion, and in the system described is equal, to the amounts by which the internal error signal rises above or falls below the upper and lower threshold values, such a variation is converted into an anti-reset signal which cannot rise above or fall below third maximum and minimum values (+5 volts or −5 volts relative to the reference potential of junction 45). As noted above, the maximum and minimum values of the anti-reset signal are preferably made equal to the maximum and minimum values of the reset signal, so that complete reset inhibition can be obtained but without polarity reversal of the reset signal and the slowness of response which such reversal would entail.

It will be clear from the foregoing that the present system provides proportional plus reset action so as to adjust and maintain the temperature of the furnace 10 in agreement with a set point value determined by adjustment of the knob 11. The reset action proceeds in normal fashion under "on line" conditions when the operation of the system does not exceed the proportional band. In this way, automatic reset produces correction for offsets, and without excessive or objectionable overshoot. The reset inhibiting portion of the present system produces no effect at all unless the system is subjected to conditions which make it operate with maximum or minimum corrective action. Those conditions are sensed by determining when the internal error signal rises above or falls below predetermined threshold values, such values never being reached unless the output signal C reaches its maximum or minimum value so that the heater element 14 is receiving maximum or minimum current. Then, when the threshold values are exceeded, the reset signal or voltage on the capacitor 40 is progressively inhibited in proportion to the amount by which the threshold values are exceeded, but this inhibition is limited by the clamping means (the diodes 60 and 61) so that the maximum effect of the anti-reset signal is to fully inhibit or remove the reset voltage.

It will be apparent also that during start-up of the control system, or subsequent to the occurrence of any severe upset (e.g., abruptly increasing the set point or inserting a large quantity of cold materials into the furnace 10), the reset action is fully inhibited and the action of the control system is proportional alone until the system is brought substantially to operation within the proportional band. Thereafter the system operates with proportional plus reset action to restore the system to the control point while automatically compensating for offset.

Noteworthy is the fact that the present system is one which can be achieved by adding only a relatively few physical components to a conventional proportional plus reset control device. The Zener diodes, resistors, and conventional diodes which are required are all commercially available at low prices and with established reliability of performance. Thus, the present invention brings to the art a solution to the serious problem of reset windup which can be realized by very simple and inexpensive additions to already existing control systems.

While a specific embodiment of a system utilizing the invention has been shown diagrammatically in FIG. 1, this is by way of example only, and it will be apparent to those skilled in the art that numerous modifications and equivalents may, if desired, be employed. Merely by way of example, the specific values of the voltages or signals which have been referred to for purposes of explanation may, of course, be changed to other values. Any condition other than temperature may be controlled by the manipulation of various other mediums besides electric current and various other well known devices may be employed as an alternative for the recording potentiometer 12 for the purpose of creating a primary error signal. Finally, it will also be apparent to those skilled in the art that although the invention has here been described as embodied in an electric control system employing voltages or currents as varying signals, the essential aspects of the invention may also be embodied in pneumatic, hydraulic or mechanical control systems having pressure, flow or mechanical signals produced and varied in manners analogous to the electrical signals which have herein been described. Accordingly, various elements recited in the appended claims are to be construed in the light of the exemplary electrical embodiment shown in FIG. 1, but bearing in mind the various pneumatic, hydraulic and mechanical equivalents of those elements which are known to those skilled in the art.

I claim as my invention:

1. In an automatic control system for correctively changing and maintaining a controlled condition to agree with a set point value, the combination comprising means for creating a primary error signal which varies in sense and magnitude within a proportional band according to the sign and extent of the difference error between the set point value and the controlled condition value, means responsive to the primary error signal for creating a reset signal which varies substantially as a time integral function of said difference error, an amplifier jointly responsive to said primary error signal and said reset signal for producing an internal error signal which varies as the algebraic combination thereof, means responsive to said internal error signal for producing a controller output signal which varies substantially as the internal error signal between first maximum and minimum values and which remains constant at such values when the internal error signal rises above or falls below first and second predetermined values, means for correctively changing said controlled condition according to said output signal to bring the controlled condition to the set point value, means responsive solely to said internal error signal for producing an auxiliary signal which varies according to the amounts by which said internal error signal rises above or falls below predetermined, fixed upper and lower threshold values, and means responsive to said auxiliary signal for inhibiting said reset signal.

2. The combination set forth in claim 1, further characterized in that said upper and lower threshold values are respectively higher and lower than said first and second predetermined values by predetermined amounts.

3. The combination set forth in claim 1 further characterized by means for limiting said reset signal to second maximum and minimum values respectively as an error difference of one polarity or the other and exceeding the proportional band persists, said means responsive to said auxiliary signal including means for producing an anti-reset signal which varies substantially as the auxiliary signal and means for holding said anti-reset signal constant at third maximum and minimum values when the auxiliary signal rises above or falls below corresponding third and fourth predetermined values, said third maximum and minimum values of said anti-reset signal being substantially equal respectively to said second maximum and minimum values of said reset signal.

4. In an automatic control system for correctively changing and maintaining a controlled condition to agree with a set point value, the combination comprising means for creating a primary error signal which varies in sense and magnitude according to the sign and extent of the difference error between the set point value and condition value, an amplifier responsive to the algebraic combination of said primary error signal and a negative feedback signal for producing an internal error signal, means responsive to said internal error signal for producing a controller output signal which varies between predetermined first maximum and minimum values as the internal error signal varies over a range wider than that defined by first and second predetermined values necessary to cause the output signal to reach said maximum or minimum values, means responsive to said output signal for varying a manipulated medium to correctively adjust and maintain the controlled condition, means responsive to said output signal for producing the aforesaid negative feedback signal, said last-named means including means for producing a reset signal which normally varies between second maximum and minimum values as an integral function of said output signal and which reduces said negative feedback signal so as to produce reset action, means responsive solely to said internal error signal for producing an auxiliary signal which varies in proportion to the amounts by which the internal error signal exceeds predetermined, fixed upper and lower threshold values, and means for inhibiting the magnitude of said reset signal by an amount proportional to the value of said auxiliary signal, thereby to avoid reset windup.

5. The combination set forth in claim 4, further characterized in that said upper and lower threshold values are respectively higher and lower than said first and second predetermined values of said internal error signal.

6. The combination set forth in claim 5, further characterized by means for limiting the inhibition of said reset signal to extents no greater than the said second maximum and minimum values, respectively, so that maximum effect of said auxiliary signal is to reduce said reset signal to zero.

7. In an automatic control system for adusting the transfer of a manipulated medium for correctively changing and maintaining a controlled condition to agree with a set point value, the combination comprising means for producing a primary error signal which varies in sense and magnitude according to the sign and extent of the difference error between the set point value and condition value within a limited proportional band, an algebraic summing amplifier responsive to said primary error signal and a negative feedback signal for producing an internal error signal which varies in proportion to the algebraic sum of the two input signals, means responsive to said internal error signal for producing a controller output signal which varies substantially in proportion to the internal error signal between first maximum and minimum values even though the internal error signal rises above or falls below corresponding predetermined first and second values, means for controlling the rate of transfer of the manipulated medium between maximum and minimum rates in response to the variation of said output signal between said first maximum and minimum values, means responsive to said output signal for producing the aforesaid negative feedback signal and applying it as an input to said summing amplifier, said last-named means including means for producing a reset signal which normally varies as a time integral function of said control signal and which decreases or increases the negative feedback signal so as to produce reset action, said reset signal varying between second maximum and minimum values which it reaches when said control signal persists at its first maximum and minimum values, means responsive solely to said internal error signal for producing an auxiliary signal which varies in proportion to the amounts by which the internal error signal varies above or below predetermined, fixed upper and lower threshold values, and means for inhibiting said reset signal in accordance with said auxiliary signal, thereby to avoid reset windup.

8. The combination set forth in claim 7, further characterized in that said upper and lower threshold values of said internal error signal are respectively greater or less than said predetermined first and second values of said internal error signal.

9. The combination set forth in claim 8, further characterized in that the last-named means includes means responsive to said auxiliary signal for producing an anti-reset signal which varies substantially in proportion to the auxiliary signal between third maximum and minimum values but which remains constant at such values when the auxiliary signal rises above or falls below corresponding predetermined third and fourth values, and means for inhibiting said reset signal in accordance with said anti-reset signal.

10. The combination set forth in claim 7, further characterized in that said upper and lower threshold values of said internal error signal have predetermined values which result in the auxiliary signal being zero unless the internal error signal rises above or falls below said first and second values by amounts at least as large as said second maximum and minimum values of said reset signal, so that normal reset action is uninhibited unless reset windup would otherwise tend to occur.

11. The combination set forth in claim 9, further characterized in that said third maximum and minimum values of said anti-reset signal are substantially equal respectively to said second maximum and minimum values of said reset signal.

12. In an automatic control system for adusting the transfer of a manipulated medium to control and maintain a variable condition in agreement with a set point value, the combination comprising means for producing a primary error voltage which varies in sense and magnitude according to the sign and extent of the difference error between said set point value and the condition value, a summing amplifier connected to receive said primary error voltage and a negative feedback voltage as inputs and producing an internal error voltage which varies in proportion to the algebraic sum of such inputs, means including a clamping diode circuit responsive to said internal error voltage for producing an output voltage which varies substantially in proportion to the internal error signal but which is limited to first maximum and minimum values beyond which it could vary in the absence of clamping action, means responsive to said output voltage for controlling the rate of transfer of the manipulated medium to thereby vary the controlled condition, means responsive to said output voltage for producing the aforesaid negative feedback voltage, said last-named means including a capacitor normally charged or discharged as a time integral function of said output voltage and producing thereacross a reset voltage which normally reduces said negative feedback voltage, said reset voltage reaching second maximum and minimum values when the control voltage persists at its maximum and minimum values, diode means connected to and responsive solely to said internal error signal for producing an auxiliary voltage which varies according to the amount by which the internal error voltage rises above or falls below predetermined upper and lower threshold values, means including a diode clamp circuit responsive to said auxiliary voltage for producing an anti-reset voltage which varies in proportion to the auxiliary voltage between third maximum and minimum values, and means for reducing said reset voltage across said capacitor by amounts proportional to said anti-reset voltage.

13. The combination set forth in claim 12, further characterized in that said upper and lower threshold values have magnitudes producing zero auxiliary voltage until the internal error signal substantially rises above or falls below the values thereof which cause said output voltage to reach said first maximum and minimum values.

14. The combination set forth in claim 12 further characterized in that said third maximum and minimum values of said anti-reset signal are substantially equal to said second maximum and minimum values of said reset signal.

References Cited

UNITED STATES PATENTS

| | | | |
|---|---|---|---|
| 2,621,315 | 12/1952 | Cuckler | 318—29 |
| 2,830,244 | 4/1958 | Davis | 318—28 |
| 3,219,936 | 11/1965 | Eksten et al. | 328—69 |
| 3,221,257 | 11/1965 | Ohlson | 328—69 |

JOHN F. COUCH, *Primary Examiner.*

WARREN E. RAY, *Examiner.*